United States Patent [19]

Tsuchiya et al.

[11] Patent Number: 5,040,242
[45] Date of Patent: Aug. 13, 1991

[54] OPTICAL COMMUNICATION APPARATUS AND METHOD

[75] Inventors: Yukinari Tsuchiya, Ueda; Tetsuo Saito, Tokyo, both of Japan

[73] Assignee: Totoku Electric Co., Ltd., Tokyo, Japan

[21] Appl. No.: 546,690

[22] Filed: Jun. 28, 1990

Related U.S. Application Data

[63] Continuation of Ser. No. 244,333, Sep. 15, 1988, abandoned.

[30] Foreign Application Priority Data

Sep. 16, 1987 [JP] Japan ................................ 62-229640
Jun. 2, 1988 [JP] Japan ................................ 63-134505
Jul. 24, 1988 [JP] Japan ................................ 63-183586

[51] Int. Cl.[5] ............................................. H04B 10/16
[52] U.S. Cl. ..................................... 359/154; 359/174
[58] Field of Search .............................. 455/600-603, 455/606-613, 617-619

[56] References Cited

U.S. PATENT DOCUMENTS

| | | | |
|---|---|---|---|
| 4,229,830 | 10/1980 | Ryan | 455/608 |
| 4,356,509 | 10/1982 | Skerlos | 455/603 |
| 4,398,172 | 8/1983 | Carroll | 455/604 |
| 4,531,239 | 7/1985 | Usui | 455/602 |
| 4,678,937 | 7/1987 | Price | 455/602 |
| 4,694,504 | 9/1987 | Porter | 455/619 |
| 4,713,841 | 12/1987 | Porter | 455/608 |
| 4,817,204 | 3/1989 | Janelli | 455/612 |

FOREIGN PATENT DOCUMENTS

| | | | |
|---|---|---|---|
| 0080032 | 5/1984 | Japan | 455/619 |
| 0030823 | 2/1986 | Japan | 455/600 |
| 1233221 | 5/1986 | U.S.S.R. | 455/606 |

Primary Examiner—Reinhard J. Eisenzopf
Assistant Examiner—L. Pascal
Attorney, Agent, or Firm—Price, Heneveld, Cooper, DeWitt & Litton

[57] ABSTRACT

Information processors are interconnected via an optical communication apparatus and an optical communication medium to perform data communication. Each information processor has a standard interface which operates based on electric signals, and input/output control is executed in accordance with the standard interface specifications. The optical communication apparatus is provided with an input electric signal from the information processor, converts the electric signal into a corresponding optical signal upon performing pulse-width modulation in such a manner that the pulse width differs at the leading and trailing edges of the electric signal, and outputs the optical signal to the optical communication medium. Conversely, the apparatus is provided with a pulse-width modulated input optical signal from the optical communication medium, discriminates the leading and trailing edges of an electric signal from the pulse width, demodulates the optical signal and converts it into a corresponding electric signal outputted to the information processor. The optical communication apparatus produces all of the required driving power from output electric signal lines from the information processor.

8 Claims, 12 Drawing Sheets

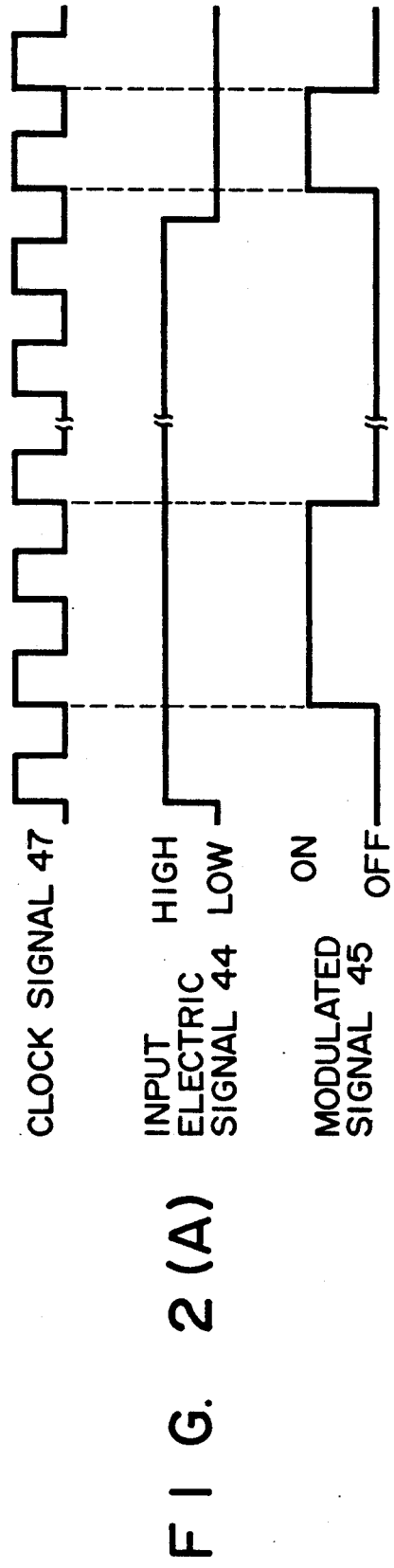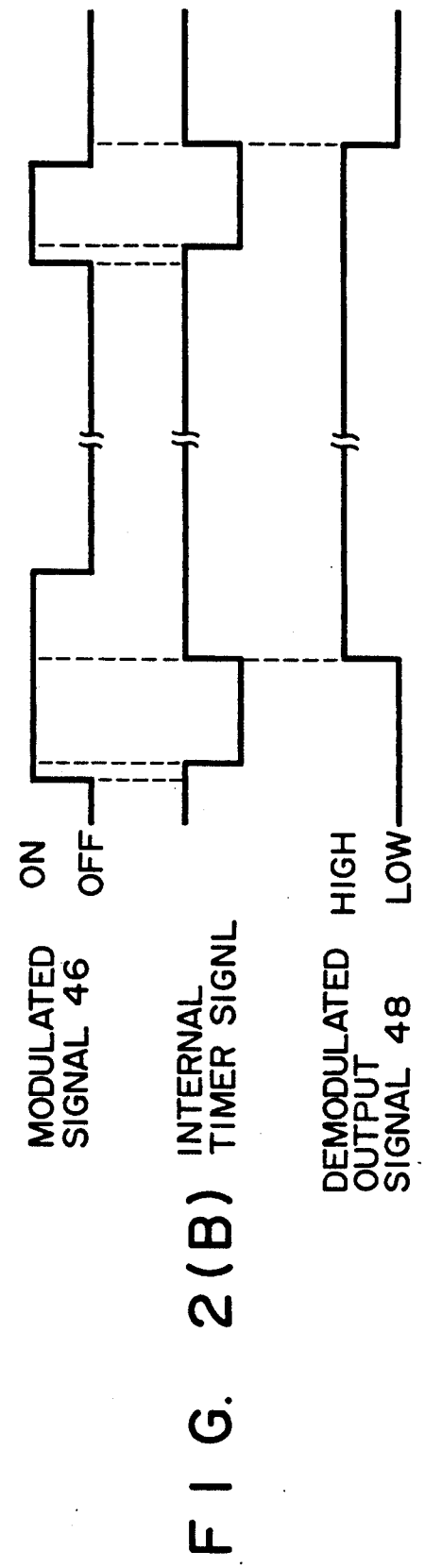

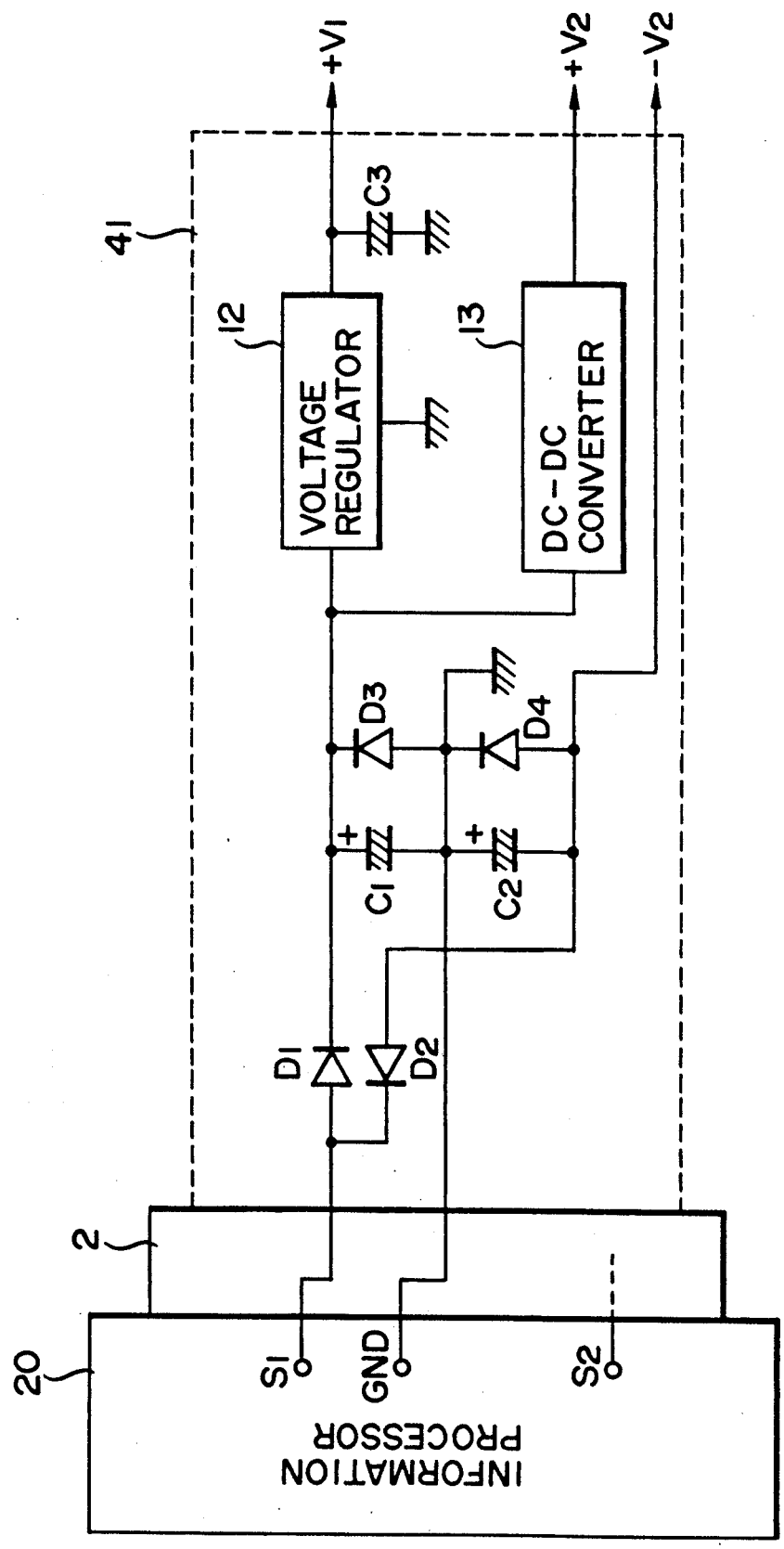
F I G. 3

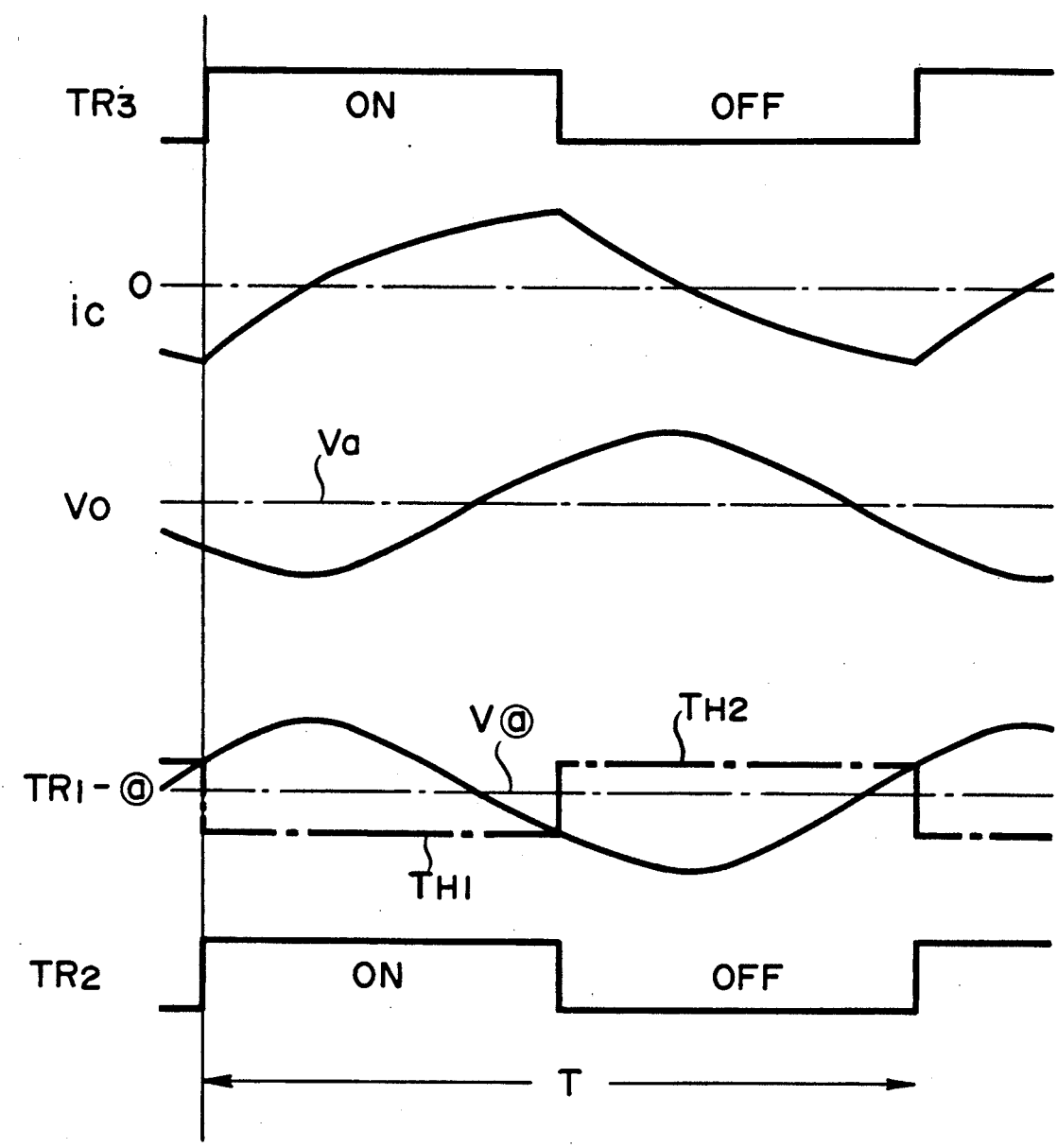
F I G. 5

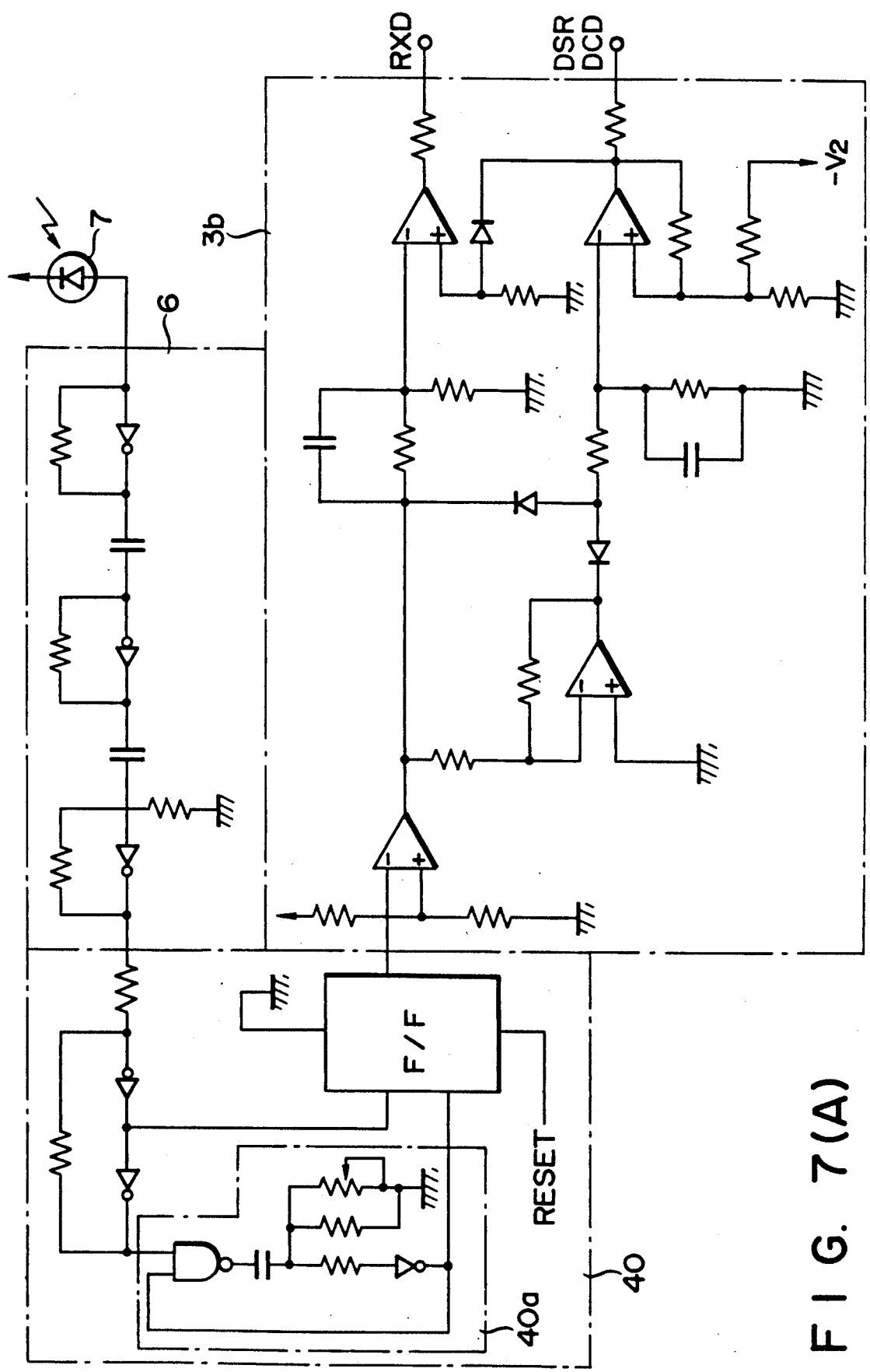
F I G. 7(A)

OPTICAL COMMUNICATION APPARATUS AND METHOD

This is a continuation of co-pending application Ser. No. 244,333, filed on Sept, 15, 1988.

BACKGROUND OF THE INVENTION

This invention relates to an optical communication apparatus connected between an optical communication medium, and an information processor, and to an optical communication method using this apparatus. More particularly, the invention relates to an optical communication apparatus useful in transmitting optical signals between electronic devices such as a computer and a terminal unit or within these electronic devices Conventional electrical communication systems which rely primarily upon metallic conductor cables are being replaced in greater number by optical communication systems in which devices are interconnected by optical fiber cables or the like so that information may be transmitted between these devices in the form of optical signals. The reason for this is that optical communication systems possess such important advantages as the ability to transmit information in large volume and little susceptibility to the adverse effects of electromagnetic noise and the like. These systems are being employed widely especially in the field of communication by specific transmission circuit networks and pay station circuit network.

Optical communication systems are now finding use especially in the field of information transmission between individual information processors that deal with a comparatively small amount of information. For example, these systems are being utilized for communication between electronic devices such as a computer and an automatic controller, a LAN node and a terminal unit or a host computer and a terminal computer These systems also find use as means for transmitting signals within these devices.

However, when an optical communication is employed for signal transmission between or within such devices, an optical communication apparatus required for special-purpose optical transmission must be separately provided as a substitute for the interface of the conventional electrical communications system.

In order to construct this optical communication apparatus, it is necessary to provide an electro-optical converter circuit drive unit for driving an electro-optical converter circuit adapted to convert electrical signals from a processor, the electro-optical converter circuit (a light-emitting element or the like), an opto-electrical converter circuit (a light-receiving element or the like), and an amplifier circuit for amplifying the signal from this circuit Also required is a driving power supply for operating each of these components.

Owing to the need for these special-purpose components, the already existing electrical communication apparatus cannot be used as is for optical communication. In other words, optical communication using this apparatus is impossible without adding on special components and power supply equipment This is a disadvantageous requirement in terms of space and cost in comparison with the electrical communication systems used so far.

When it is attempted to achieve optical communication with the existing apparatus, an optical transmission adapter having power supply equipment for obtaining the necessary power from a special-purpose commercial power source must be separately connected to the apparatus, after which the apparatus is connected to an optical fiber cable or the like.

The construction of this conventional adapter for optical transmission is illustrated in FIG. 9. Shown in FIG. 9 are an optical communication apparatus 1, optical communication connectors 8, 9, fiber cables 10a, 10b for optical communication, a power supply section 14, an AC adapter 15, a plug 16 and an information processor 20. For optical communication in two directions, an electric signal S1 for information transmission from the information processor 20 is sent to a light-emitting element drive circuit 4 through an electrical connector 2 and a receiver circuit 3a in an interface circuit 3. The signal S1 is converted into a corresponding optical signal by a light-emitting element 5, and the optical signal is delivered to the optical fiber cable 10a via the optical communication connector 8 to be transmitted to a light-receiving element in an electronic device at the destination An optical signal sent via the optical fiber cable 10b from a light-emitting element in the electronic device of another party is received by a light-receiving element 7 via the optical communication connector 9 to be converted into an electric signal Following amplification by an amplifier circuit 6, the signal is transmitted as a received signal to a signal line S2 of the information processor 20 via a driver circuit 3b of the interface 3 and the electrical connector 2.

In such signal transmission and reception, the power supply unit 14 supplies all of the power needed to drive the electro-optical converter section which includes the light-emitting element drive circuit 4 and the light-emitting element 5, the opto-electrical converter section which includes the amplifier circuit 6 and the light-receiving element 7, and the receiver circuit 3a and driver circuit 3b of the interface circuit 3.

The supply of power to the power supply unit 14 is achieved by connecting driving DC power, obtained by converting commercial AC power into DC power via the AC adapter (AC-DC converter) 15, to a power supply receptor 17 of the optical communications apparatus power supply unit 14 via a plug 16. Alternatively, the necessary power can be received from the information processor 20 via a special-purpose power supply line P without the plug 16 from the AC adapter 15 being inserted into the power supply unit 14.

The power supplied to the power supply unit 14 is subjected to a voltage conversion to output power of $+V1$ at a first terminal thereof. Also, power $\pm V2$ is produced as an output via an internal filter circuit, which comprises an inductor L and capacitors C4, C5, and an internal DC-DC converter 18.

The $+V1$ power is supplied to the light-emitting element 5, the light-receiving element 7, the drive circuit 4 that drives the light-emitting element 5, and the amplifier circuit 6 that amplifies the electric signal from the light-receiving element 7. The $\pm V2$ power is supplied to the receiver circuit 3a and driver circuit 3b of the interface circuit 3.

A direct brightness modulation/demodulation system having a comparatively simple circuit construction is employed as the signal modulation/demodulation system at the time of the electro-optical conversion and opto-electrical conversion.

An example of this direct brightness modulation/demodulation is as shown in FIG. 10(A) and 10(B). At the time of transmission, as illustrated in FIG. 10(A), an electric signal sent by the information processor 20 and received by the receiver circuit 3a is transmitted from the latter to the drive circuit 4, which causes the light-emitting element 5 to emit light in such a manner that the pulse duty time of the electric signal inputted to the driver circuit 4 is made to correspond to the light emission time of the element 5. At the time of reception, as shown in FIG. 10(B), the optical signal received by the light-receiving element 7 is converted (demodulated) into an electric signal the pulse duty time whereof corresponds to the light reception duty time. After amplification in the amplifier circuit 6, the electric signal is sent to the information processor 20 via the driver circuit 3b.

Thus, in the conventional optical communications apparatus, all of the power necessary for driving the interface circuit 3, the electro-optical converter circuit comprising the drive circuit 4 and light-emitting element 5 and the opto-electrical converter circuit comprising the amplifier circuit 6 and the light-receiving element 7 must be separately furnished externally via a specially provided power supply unit.

In other words, it is necessary to specially provide an output of power from within the information processor 20 or to furnish an arrangement for obtaining DC power from a specially provided commercial AC power supply to drive the apparatus.

As a result, it is necessary to adopt a configuration in which the information processor 20 is equipped with a special optical transmission arrangement or a configuration in which an AC power supply terminal is separately provided and a special-purpose AC-DC converter. Either alternative is disadvantageous in that the overall cost and size of the optical communication apparatus are increased.

Furthermore, since the signal modulation/demodulation system employs direct brightness modulation/demodulation in the conventional optical communication apparatus, the light-emitting element, which consumes the most power within the apparatus, is required to emit light continuously during the high or low pulse duty time of the inputted electric signal for transmission. Consequently, the power consumed ranges from several hundred milliwatts to several watts. Reducing this power consumption constitutes a problem in the prior art.

As disclosed in U.S. Pat. No. 4,534,039 and U.S. Pat. No. 4,677,646, inventions have been proposed in which the required power is formed from an input control signal line and a received signal is converted into a corresponding output signal, whose specifications are those of a desired interface, by the power acquired from the control signal line However, this art is used in converting one electric signal into another, which ordinarily requires little consumption of power, and cannot be employed in an apparatus that performs an electro-optical conversion consuming a large amount of power at the time of light emission.

SUMMARY OF THE INVENTION

An object of the present invention is to solve the aforementioned problems encountered in the prior art.

According to the present invention, the foregoing object is attained by providing an optical communication apparatus comprising first converting means to which is inputted an electric signal from an information processor for converting the electric signal into a corresponding optical signal upon subjecting the electric signal to pulse-width modulation, and for outputting the optical signal to an optical communication medium, second converting means to which is inputted the pulse-width modulated optical signal from the optical communication medium for converting the optical signal into a corresponding electric signal upon demodulating the optical signal, and for outputting the electric signal to the information processor, and power producing means for producing power, which drives the first and second converting means, from the electric signal obtained from the information processor.

In accordance with this arrangement, it is possible to obtain the power for driving the optical communication apparatus directly from an electric signal line for transmission from the information processor. Thus, optical communication is possible without providing the information processor with any addition special equipment.

According to the present invention, the foregoing object is attained by providing an optical communication method in which information processors are interconnected via an optical communication medium to perform data communication, wherein an optical communication apparatus is interposed between an information processor performing data communication and the optical communication medium, the optical communication apparatus having first converting means to which is inputted an electric signal from the information processor for converting the electric signal into a corresponding optical signal upon subjecting the electric signal to pulse-width modulation, and for outputting the optical signal to the optical communication medium, second converting means to which is inputted the pulse-width modulated optical signal from the optical communication medium for converting the optical signal into a corresponding electric signal upon demodulating the optical signal, and for outputting the electric signal to the information processor, and power producing means for producing power, which drives the apparatus, from the electric signal obtained from the information processor, and wherein a standard interface which operates based on electric signals is provided in the information processors, data being communicated between the information processors in the form of pulse-width converted optical signals by performing input/output control according to the specifications of the standard interface.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 2(A) is a timing chart illustrating modulation processing according to this embodiment;

FIG. 2(B) is chart illustrating demodulation processing according to this embodiment;

FIG. 3 is a detailed circuit diagram of a stabilized power supply circuit according to this embodiment;

FIG. 5 is a waveform diagram showing operating waveforms of the DC-DC converter illustrated in FIG. 4;

FIG. 11(B) is a timing chart showing a received electric signal with regard to light emission timing in the prior art.

DESCRIPTION OF THE PREFERRED EMBODIMENTS

Preferred embodiments of the present invention will now be described in detail with reference to the drawings.

Figure 1:
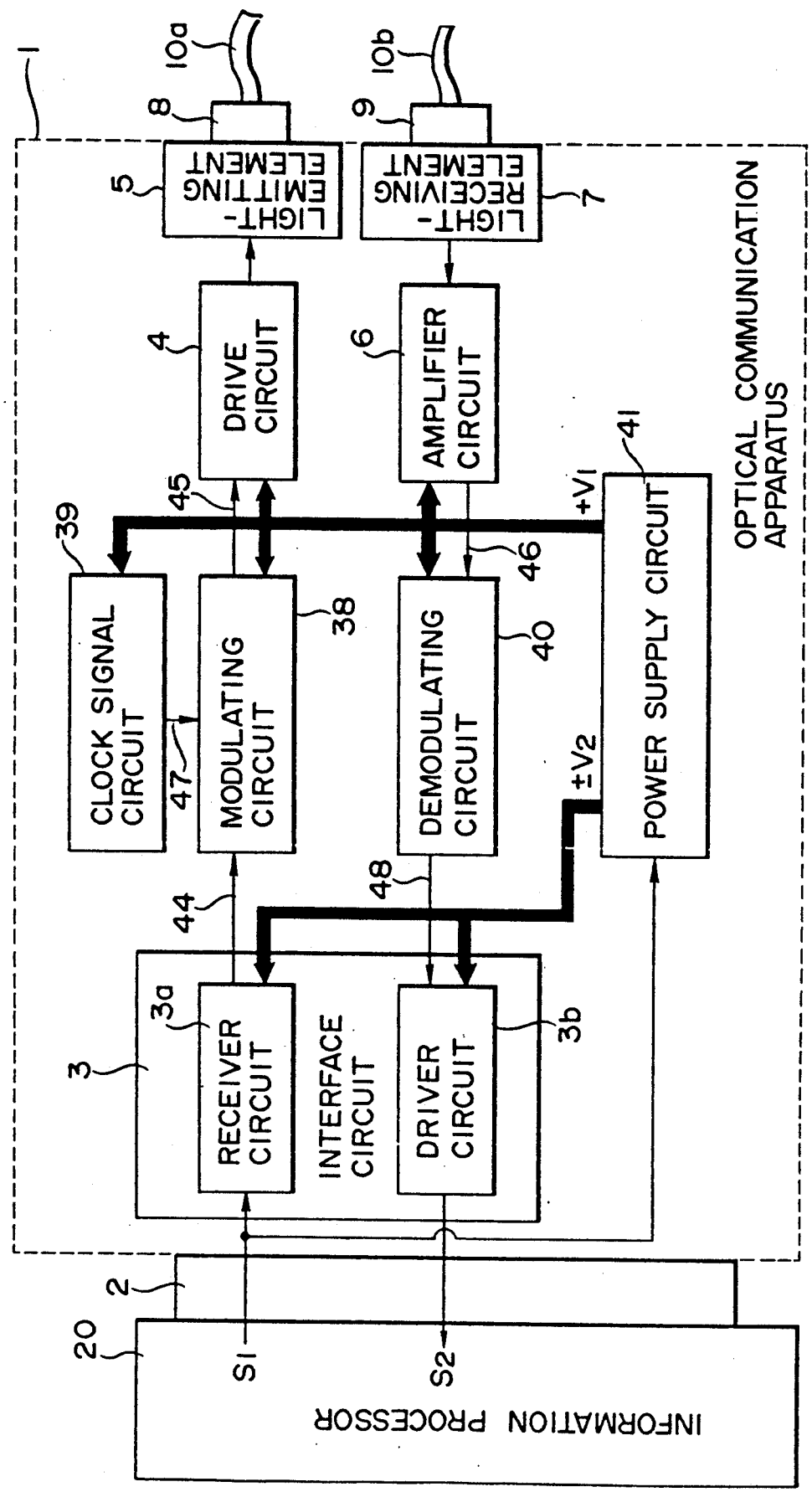
FIG. 1 is a circuit diagram illustrating an embodiment of an optical communication apparatus according to the present invention.
Figure 9:
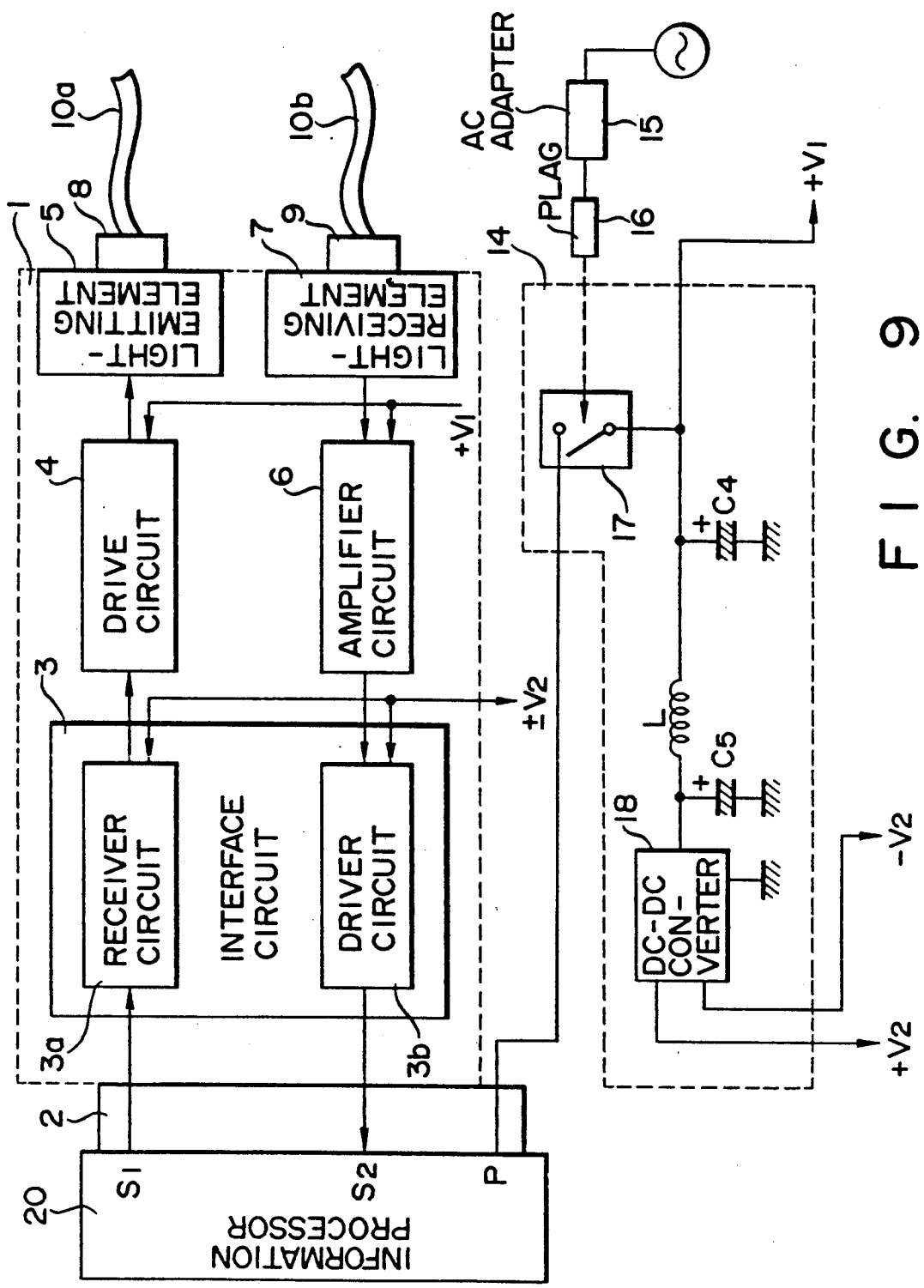
FIG. 9 is a circuit diagram of an optical communication apparatus according to the prior art.

FIG. 1 is a block diagram illustrating a first embodiment of the present invention, in which portions similar to those shown in FIG. 9 are designated by like reference characters and need not be described in detail again. The input/output interface specifications of the information processor 20 connected to the apparatus of this embodiment are in accordance with RS232C. It should be noted that these input/output interface specifications may be such that an output signal line possesses a normally high signal polarity.

Circuitry on the transmitting side comprises the receiver circuit 3a of the interface circuit 3, a modulating circuit 38 for pulse-width modulating an input electric signal 44 shown in FIG. 2(A), the drive circuit 4 for causing the light-emitting element 5 to emit light in accordance with an input signal 45 resulting from modulation of the signal 44, and the light-emitting element 5. Circuitry on the receiving side comprises the light-receiving element 7 for receiving, and for converting into an electric signal, a modulated optical signal that has been transmitted, the amplifier circuit 6 for amplifying the electric signal from the light-receiving element 7 into an electric signal 46, a demodulating circuit 40 for demodulating the modulated electric signal 46 from the amplifier circuit 6, and the driver circuit 3b of the interface circuit 3.

The signal S1, which is outputted by a signal output driver circuit (not shown) in the information processor 20 is also inputted to a stabilized power supply circuit 41. This circuit produces, from the signal S1, the power +V1 and ±V2 necessary for driving the apparatus In order to facilitate the description, signal lines are shown in fine print and power lines are shown in bold print.

The operation of this embodiment constructed as set forth above will now be described with reference to the timing charts of FIGS. 2(A) and 2(B).

The transmission signal S1 outputted by the driver circuit (signal output IC) within the information processor 20 is delivered to the receiver circuit 3a of the interface circuit 3 via the connector 2. At the same time, the signal S1 is inputted to the stabilized power supply circuit 41.

First, with regard to the transmitting side, the electric signal 44 received by the receiver circuit 3a is inputted to the modulating circuit 38, which subjects this input signal to pulse-width modulation in synchronization with the leading edge of a clock signal 47 received from a clock circuit 39, thereby producing the pulse-width modulated signal 45. This modulated signal is inputted to the drive circuit 4, which causes the light-emitting element 5 to produce a corresponding optical signal transmitted to the light-receiving element in the other party's apparatus through the connector 8 and optical fiber cable 10a.

The timing chart for the input signal 44, modulated signal 45 and clock signal 47 is as shown in FIG. 2(A). The light-emitting element 5 is caused to emit light only when the modulated signal 45 of FIG. 2(A) is on.

Thus, as set forth above, the method of driving the light-emitting element 5, which consumes the most power within the optical communication apparatus, is improved from one in which direct brightness modulation is performed, as in the prior art, to one in which pulse-width modulation is carried out. As a result, the light emission time of the light-emitting element 5 is reduced to from one-tenth to one-hundredth or less of that in the prior-art arrangement. As shown in FIG. 2(A), the "highs" and "lows" of the input electric signal 44 are sensed in the modulating circuit 38 at the timing of the leading edge of the clock signal 47. The input electric signal 44 is modulated into a signal equivalent to two periods of the clock signal 47 at the leading edge of the input electric signal 44 and into a signal equivalent to one period of the clock signal 47 at the trailing edge of the input electric signal 44. The resulting modulated signal 45 is transmitted to the drive circuit 4. The light-emitting time of the light-emitting element 5, which is driven in response to the modulated signal 45, can be shortened to from one-tenth to one-hundredth or less in comparison with the conventional method of direct drive during the entire time that the input electric signal 44 is on.

The optical signal received from the other party's apparatus via the optical fiber cable, as shown in FIG. 1, is a modulated signal obtained by a modulating method the same as that described above in connection with transmission. Accordingly, this modulated optical signal from the light-emitting element in the other party's apparatus is received via the optical fiber cable 10b and connector 9 and subjected to an opto-electrical conversion by the light-receiving element 7. The electric signal resulting from the conversion is amplified by the amplifier circuit 6 and then inputted to the demodulating circuit 40 as the modulated signal 46. The modulated signal 46 is compared with the output of a timer incorporated within the demodulator circuit 40, whereby the "highs" and "lows" of the modulated signal are discriminated to produce the demodulated output signal 48. This demodulated signal 48 is transmitted to the information processor 20 as the signal S2 via the driver circuit 3b of interface circuit 3 and the connector 2.

The timing chart for the received modulated signal 46 and demodulated output signal 48 is shown in FIG. 2(B).

The output waveform of a timer circuit within the demodulating circuit 40 is a signal less than two periods of the clock signal 47 but not less than one period thereof and starts at the leading edge of the modulated signal 46. The leading and trailing edges of the demodulated output signal 48 are decided depending upon whether the modulated signal 46 is "high" or "low" when the output waveform of the timer represents the deenergized state.

As a result of demodulation performed in this manner, the light emission time of the light-emitting element 5 can be minimized to reduce power consumption. Pulse width defined by the leading and trailing edges of the original signal differs at the time of modulation. Therefore, if erroneous operation should occur, such as in a case where there is the influence of noise during operation or in a case where an input signal is extremely small, error recovery can be performed rapidly to minimize the effects thereof.

Furthermore, in the example shown in FIG. 1, there is only one transmission signal line serving as a transmission data signal line and only one reception signal line serving as a reception data signal line. However, modulation/demodulation in this embodiment is not limited to the foregoing example. For example, it is possible to inform the other party of the required state of the apparatus by adopting an arrangement in which a signal which distinguishes carrier signals is outputted at start-up of the information processor (i.e., when a control signal changes as in a case where a DTR signal rises at start-up of a modem within the processor). It is also permissible to adopt an arrangement in which the number of signal lines is increased and the necessary control signal is capable of being transmitted and received.

Means for supplying power for driving this transceiving circuit will now be described in accordance with FIG. 3.

FIG. 3 is a detailed circuit diagram illustrating the stabilized power supply circuit 41 of the present embodiment. The circuit 41 includes rectifying diodes D1, D2, smoothing capacitors C1, C2, a voltage regulator 12, a DC-DC converter 13, protective diodes D3, D4, and a filtering capacitor C3.

The electric signal inputted from signal line S1 of the information processor 20 via the electrical connector 2 is rectified by the diodes D1, D2 in dependence upon the "+" and "−" potentials thereof. The rectified signals have ripple removed and are smoothened by the smoothing capacitors C1 and C2. Thereafter, the voltages ±V2 for power are outputted upon being stabilized by the action of the DC-DC converter 13. These voltages ±V2 are supplied to the receiver circuit 3a and driver circuit 3b of the interface circuit 3.

At the same time, the "+" level input has its ripple eliminated and is smoothened by the smoothing capacitor C1, after which it is stabilized by the voltage regulator 12 to obtain the +V1 power. This power is supplied to the modulating circuit 38, the clock signal circuit 39 and the drive circuit 4 including the light-emitting element 5, which are on the transmitting circuit-side, and to the amplifier circuit 6 including the light-receiving element 7 and the demodulating circuit 40, which are on the receiving circuit-side.

The power supplied by the stabilized power supply circuit 41 is limited by the supply current of the signal output driver circuit for transmission in the information processor 20. It is also possible to utilize as power a control output driver circuit other than the output driver circuit for transmission For example, if the specifications of the interface are RS-232C specifications, RTS, DTR signals and the like can be utilized.

Figure 4:
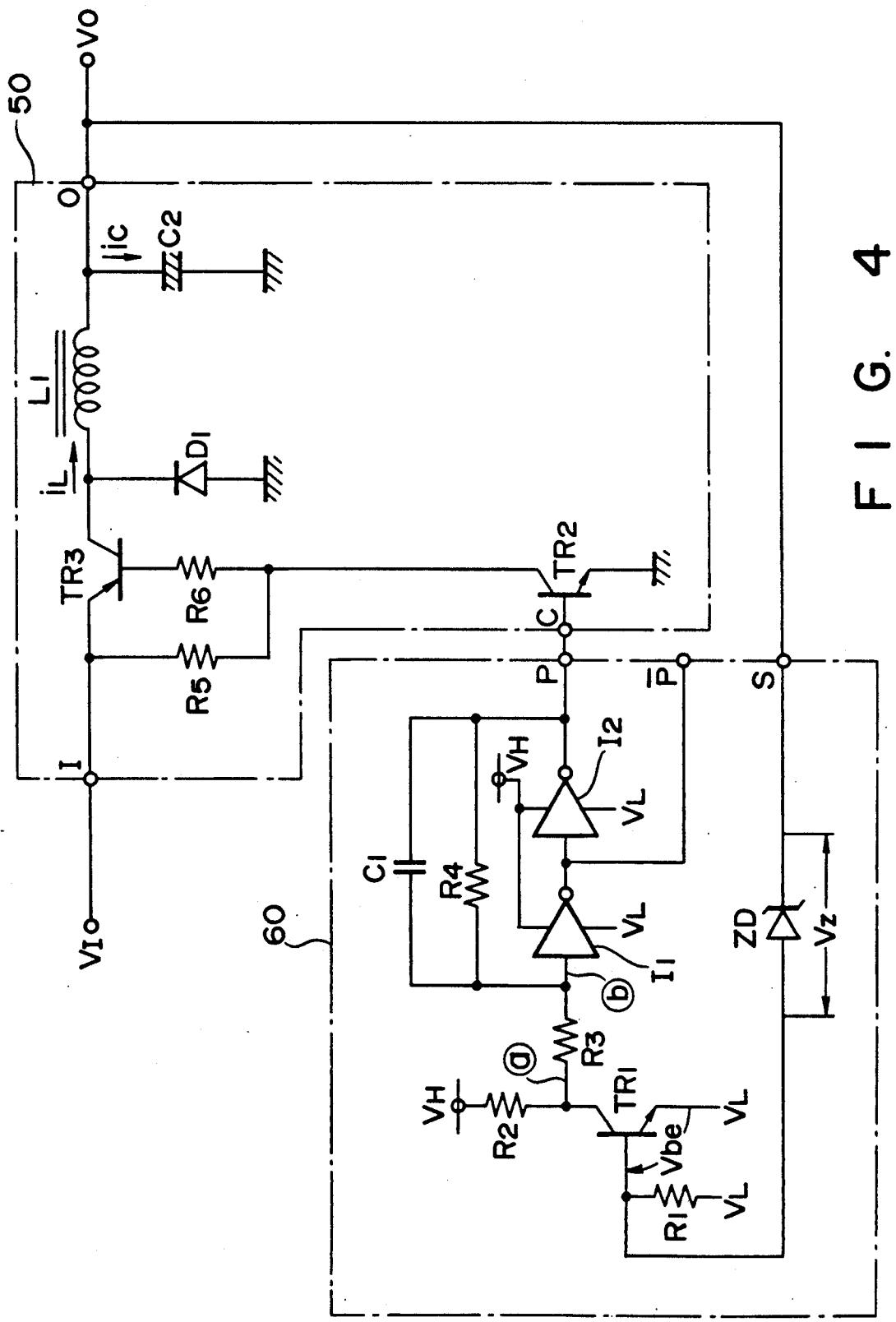
FIG. 4 is a circuit diagram of a DC-DC converter having a switching-type constant-voltage control circuit used in this embodiment.

FIG. 4 is a circuit diagram of a voltage regulator for stably controlling a voltage of a desired level through a simple and standardized circuit arrangement ideal for use in the present embodiment. In this embodiment, the stabilized voltage used is +5 V.

In FIG. 4, numeral 50 denotes an ordinary chopper circuit and numeral 60 designates a switching-type constant-voltage control circuit used in this embodiment. This diagram shows that the control circuit 60, the major portion of which is standardized and manufactured as a discrete unit, can be connected to various other chopper circuits from the outside or may be incorporated within various chopper circuits from the start.

The chopper circuit 50 includes a transistor TR2 for amplifying the switching signal of a terminal C and for controlling the on/off operation of a power transistor TR3 via a resistor R6. A reactor L1 holds a load current iL substantially constant, and a capacitor C2 smoothens an output voltage Vo. A reflux diode D1 supplies the power from a reactor L1 to the load during the time that the transistor TR3 is off.

The switching-type constant-voltage control circuit 60 includes inverter circuits I1, I2 that, together with resistors R3, R4, construct a Schmidt circuit. The Schmidt circuit has first and second threshold values TH1, TH2 decided by the resistors R3 and R4 when power supply voltages VH, VL are determined. By way of example, it is possible to make the power supply voltages $VH=VI=15$ V, $VL=0$ V (GND). In such case, the switching level of the inverter circuit I1 at the point b is considered to be in the vicinity of $(VH-VL)/2$. In actuality, since arbitrary values can be used as VH and VL, the switching level at the point b is decided accordingly and fixed. Therefore, the first and second threshold values TH1, TH2 of the Schmidt circuit can be decided with the switching level at point b serving as a reference in any case whatsoever. Furthermore, as for the IC constructing the inverter circuits I1, I2, it is unnecessary to stabilize VH and VL so long as these are within the range of power supply voltages used. This is advantageous in terms of cost.

In this embodiment, the first threshold voltage TH1 is the voltage at a point a which will make the voltage at the point b less than the switching level when the inverter circuit I2 is off (i.e., at the high level). The second threshold voltage TH2 is the voltage at the point a which will make the voltage at the point b higher than the switching level when the inverter circuit I2 is on (i.e., at the low level). When the first and second threshold values TH1, TH2 are thus decided, this portion will not be affected regardless of the value of the output voltage Vo to be stabilized.

It should be noted that signals which are the reverse of each other are obtained from output terminals P, P/ for the switching control signals This to provide a control circuit of this type with universality. Also, CMOS-IC's (e.g. 4049) are used as the inverter circuits I1, I2 for the purpose of reducing power consumption.

A transistor TR1 and a resistor R2 form a grounded emitter-type inverting amplifier circuit. The gain of this amplifier circuit is set in such a manner that the collector voltage (the voltage at point a) sufficiently covers the first and second threshold voltages TH1, TH2 in the operating range of the transistor TR1, described below. Accordingly, if the input range of the transistor TR1 is decided beforehand, the gain of the amplifier circuit can also be decided and the circuit construction of this portion is substantially unaffected regardless of the value of the output voltage Vo.

A Zener diode ZD and the resistor R1 decide the operating point (input range) of transistor TR1. For example, these can be selected in such a manner that the Zener voltage Vz will approximately satisfy the equation $Vz = Vo - Vbe$, where Vbe represents the operating point of the transistor TR1. As a result, a change in the output voltage Vo that is to be stabilized is level shifted by an amount equivalent to the Zener voltage Vz so that the base of the transistor TR1 is driven with the operating point thereof substantially at center. Accordingly, the output voltage Vo to be stabilized may be selected at will and the Zener voltage Vz need only be changed in accordance therewith.

It should be noted that since the Zener diode ZD is connected as shown, the voltage Vbe of transistor TR1 can be compensated for temperature.

FIG. 5 is a waveform diagram illustrating the steady state operating waveforms associated with the circuit of FIG. 4. When the switching control signal at terminal C attains the "1" (high) level, the transistors TR2 and TR3 are turned on and the reactor L1 is supplied with the negative load current iL. In the interval that follows, a portion ic of the load current iL charges the capacitor C2, so that the voltage Vo (e.g. 5 V) thereof rises upon passing through the average value Va ($=5$ V). Meanwhile, at the point a of transistor TR1, a signal TR1-(a) inverted and amplified falls toward the first threshold value TH1. When the signal TR1-(a) eventually attains the first threshold value TH1, the signal at the point b falls while passing through (VH-VL)/2, so that the inverter circuit I1 is turned off and the inverter circuit I2 is turned on. The "0" (low) level of inverter circuit I2 turns off the transistor TR2 and provides feedback to the point b via the resistor R4. As a result, the threshold value at the point a rises to TH2.

When the transistor TR2 turns off, so does the transistor TR3, thereby cutting off the supply of the load current iL. In the interval that follows, the reactor L1 is supplied with the load current iL via the reflux diode D1. At the same time that the current ic is added to the load current iL in this interval, the capacitor C2 is charged and the output voltage Vo falls while passing through the average value Va. At the point a of transistor TR1, on the other hand, the inverted and amplified signal TR-(a) rised toward the second threshold value TH2 and eventually attains the second threshold value TH2. When this occurs, the signal at the point b rises while passing through (VH-VL)/2, so that the inverter circuit I1 is turned on and the inverter circuit I2 is turned off. The "1" (high) level of inverter circuit I2 turns on the transistor TR2 and provides feedback to the point b via resistor R4. As a result, the threshold value at point a falls to TH1.

Thus, with the output voltage Vo (=average voltage Va) steady at a value of approximately 5 V, a switching signal whose duty ratio is about 50% is obtained when V1 is about 10 V. However, when the average voltage Va of the output drops below 5 V, the average voltage V(a) at point a rises accordingly. However, since the first and second threshold values TH1, TH2 are fixed, the result is that the ON interval of the transistor TR3 is lengthened and the OFF interval thereof shortened. Consequently, the average value Va of the output is returned to 5 V. Conversely, when the average value Va of the output rises above 5 V, the average voltage V(a) at point a falls correspondingly. As a result, the ON interval of the transistor TR3 is shortened and the OFF interval thereof lengthened. Accordingly, the average value Va of the output is returned to 5 V.

It should be noted that the control circuit 60 of this embodiment does not possess a so-called "soft start" function. However, if the load is small, as in the above embodiment, the transistor TR3 withstands sufficiently The voltage regulator 12 and DC-DC converter 13 are not limited to the foregoing examples Preferably, these should be constructed from components that consume as little power as possible. MOSFET-type components are particularly preferred.

It is also preferred that the other circuit portions of this embodiment be of CMOS gate-type construction to reduce power consumption. If it is necessary to provide more driving power for the light-emitting element 5, the voltage regulator 12 should be a high-performance DC-DC converter.

Figure 6:
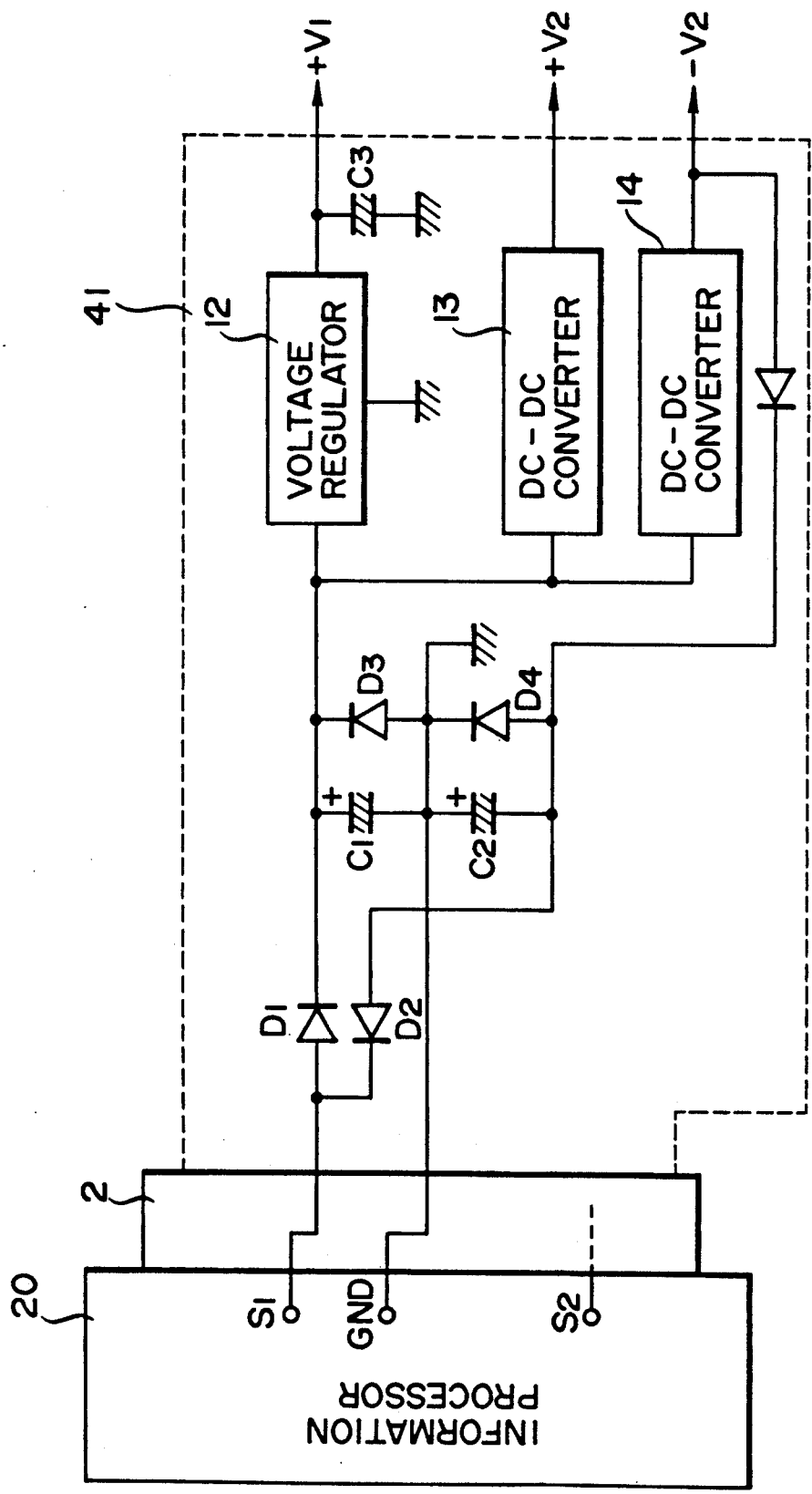
FIG. 6 is a detailed circuit diagram of a stabilized power supply circuit according to a second embodiment of the present invention.

The arrangement described above is particularly effective when transmitting and receiving ASC II character code data. However, if image data are transmitted, a case is conceivable in which the low-level (or high-level) state continues for an extended period of time. In such case there is the danger that a situation may arise in which the negative power (-V2) is inadequate. This means that the level conversion may not be performed sufficiently. Therefore, when there is data to be transmitted, it will suffice to provide a circuit system such as a converter in which the necessary negative power is obtained in addition to the production of the positive power necessary when the signal line is at the "+" level. FIG. 6 illustrates an example in which this DC-DC converter for producing the "−" power is provided. In FIG. 6, numeral 14 denotes this DC-DC converter for producing the "−" power. This makes it possible to deal with all signal line states.

The "−" power supply in this case is only used in maintaining the level of the output signal to the information processor 20. By virtue of consuming very little power, it will suffice merely to receive this power supplied from the output signal line of the information processor 20.

By producing the necessary power from both the "+" level and "−" level of the output signal line of information processor 20 or from the circuit system shown in FIG. 6, a reliable and accurate optical transmission can be made regardless of the contents of the data transmitted and received.

Furthermore, by adopting a system using constant-current drive instead of a voltage drive system to obtain the power that drives the light-emitting element 5 and the like, a further reduction in power consumption can be achieved.

If there is no particular limitation upon the timing at which a data transmission from the information processor 20 starts and the processing speed of the information processor is high, it is conceivable that transmission will start as soon as a state in which data communication is possible is achieved. In a case where the time up to the start of transmission from the information processor 20 is short, the transmission data will be transmitted before the driving voltage is sufficiently produced if the input-output potential difference of the voltage regulator 12 becomes large Thus there is the danger that the initial transmission data from the information processor 20 will be lost. In order to prevent this from occurring, it will suffice to adopt an arrangement in which the potential difference between the input voltage and output voltage of the voltage regulator 12 is reduced and the time up to the start of operation of the apparatus is shortened. In this case, each circuit should be constructed of circuit components whose operating voltage approximates the output signal level of the information processor 20. For ( example, a circuit arrangement using CMOS IC's and the like should be adopted. FIGS. 7(A) through 7(D) illustrate an example of an arrangement in which the potential difference between the input and output voltages of the voltage regulator 12 is reduced.

Figure 7B:
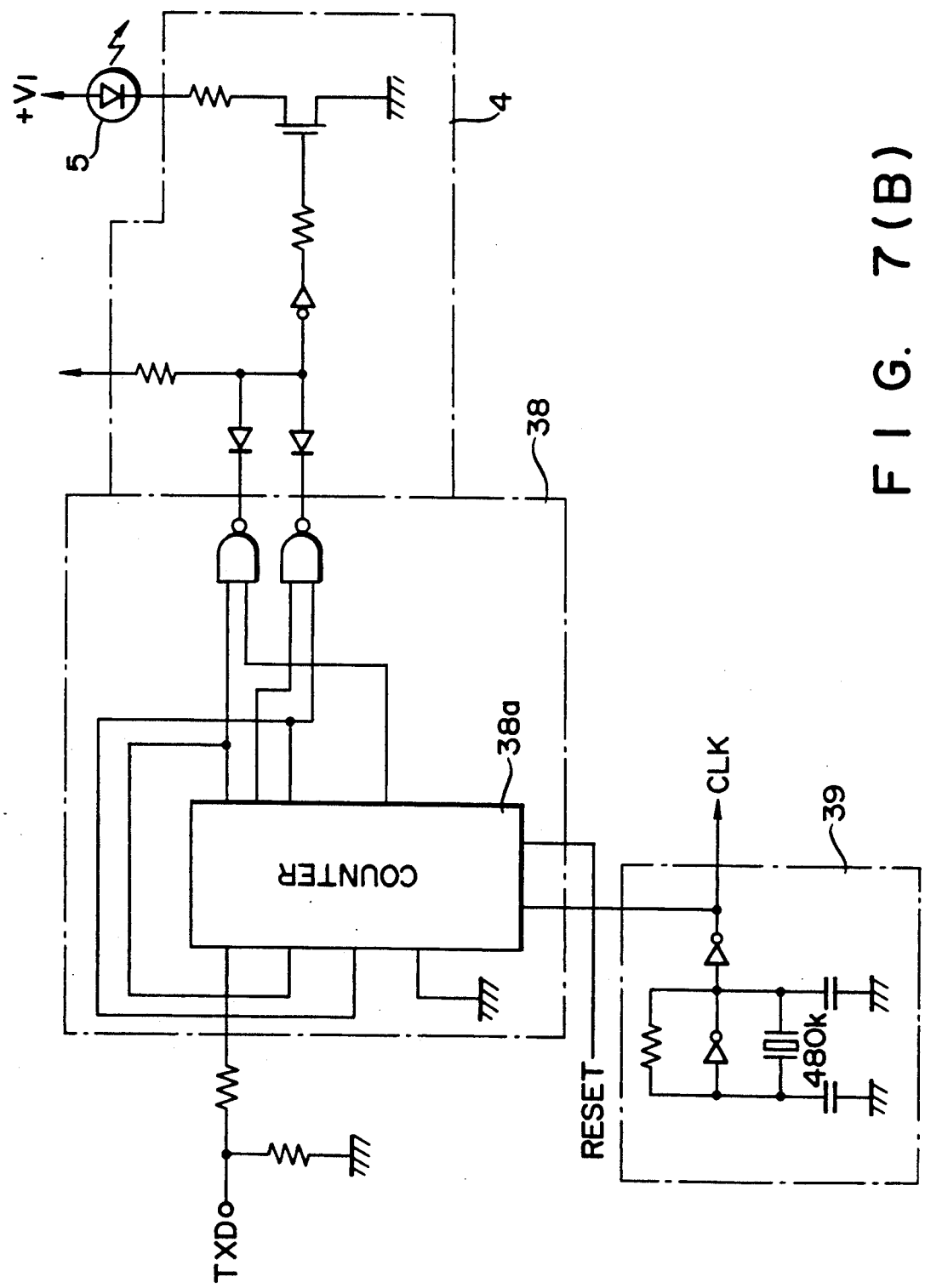
FIG. 7 is a detailed circuit diagram of a third embodiment of an optical communication apparatus according to the present invention.
Figure 7C:
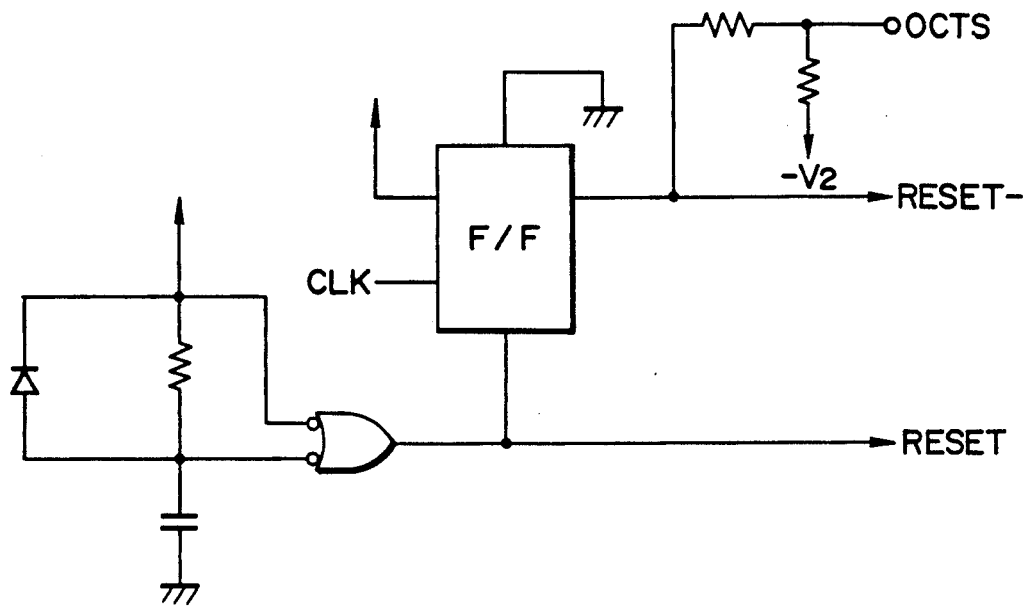
Figure 7D:
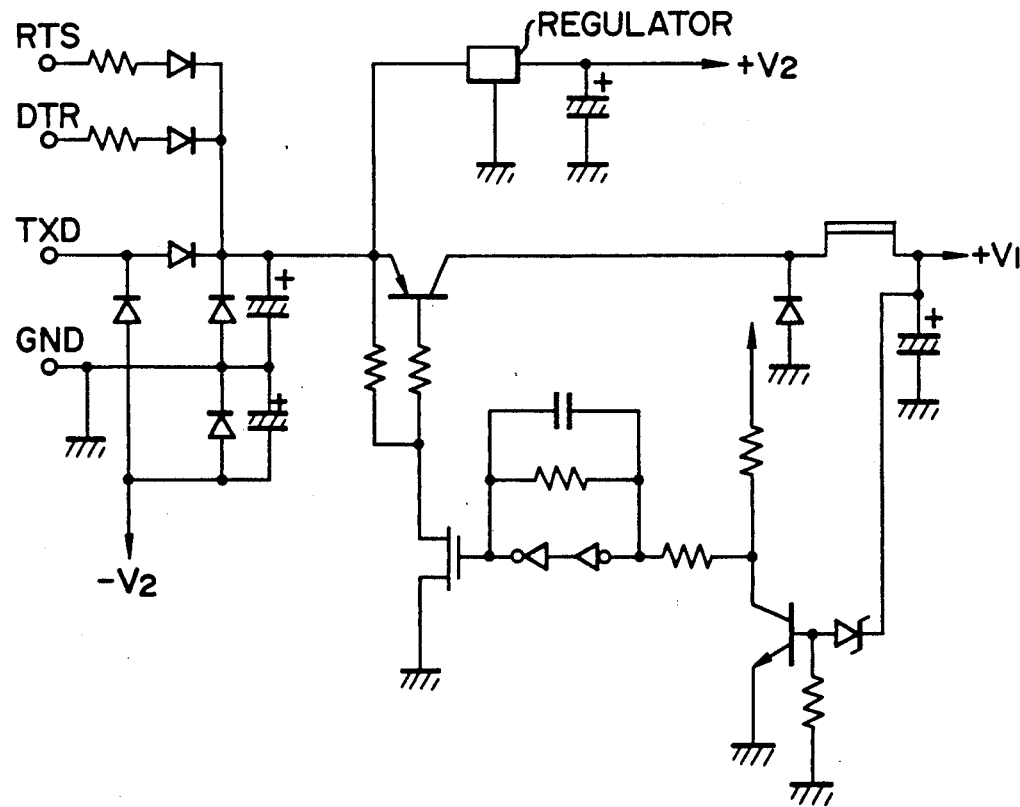

FIG. 7(A) illustrates the driver circuit 3b, amplifier circuit 6, light-receiving element 7 and demodulating circuit 40 in the signal receiving system part of FIG. 1, FIG. 7(B) shows the drive circuit 4, light-emitting element 5, modulating circuit 38 and clock signal circuit 39 in the signal transmitting system part of FIG. 1, FIG. 7(C) shows a reset circuit and a "CTS" signal generating output circuit, and FIG. 7(D) illustrates the power supply circuit 41. In FIG. 7(A), optically modulated data (RXD) from the other party's apparatus is received by the light-receiving element (photodiode) 7 and is subjected to an opto-electrical conversion thereby. The resulting electric signal is amplified by the amplifier circuit 6, which is of CMOS-IC three-stage construction, and the amplified signal is sent to the demodulating circuit 40. In the demodulating circuit 40, the output signal of an internal timer 40a which starts operating at the leading edge of the output signal from the amplifier circuit 6 is inputted to the clock terminal of a D-type flip-flop of CMOS-IC construction. As shown in FIG. 2(B), the received data rises when the amplifier circuit output turns on at the leading edge of the clock signal, and the received data falls when the amplifier circuit output turns off at the leading edge of the clock signal. This demodulated signal is delivered to the driver circuit 3b and the signal (RXD) to be received by the information processor 20 is outputted at a timing identical with that of the demodulated signal.

In the signal transmitting part of the apparatus, the transmitted signal (TXD) from the information processor 20 is inputted to the modulating circuit 38. In the modulating circuit 38, this signal is modulated and then delivered to the drive circuit 4. Modulation is performed by producing a clock signal whose pulse width is equivalent to two periods of the clock signal at the leading edge of the TXD signal and to one period of the clock signal at the trailing edge of the TXD signal, as shown in FIG. 2(A). In this embodiment, the clock signal circuit 39 produces a clock having a frequency of 480 KHz.

FIG. 7(C) shows a circuit for producing a RESET signal that initializes the apparatus of the embodiment at the leading edge of the power supply, and for outputting the CTS signal to the information processor.

FIG. 7(D) illustrates the power supply circuit 41 for a case where it is arranged to reduce the potential difference between the input and output voltages of the voltage regulator 12. In this embodiment, it is arranged so that power is derived from the "RTS" signal, "DTR" signal or "TXD" signal of the information processor, and so that the required power is obtained when any of these signals is of "+" or "−" potential. Further, since the arrangement of this embodiment is such that the other components are composed mainly of CMOS-IC's and a potential substantially the same as the output signal level from the information processor 20 is outputted, output signals are no longer lost even when communication starts as soon as the information processor 20 becomes capable of a data transmission.

Figure 8:
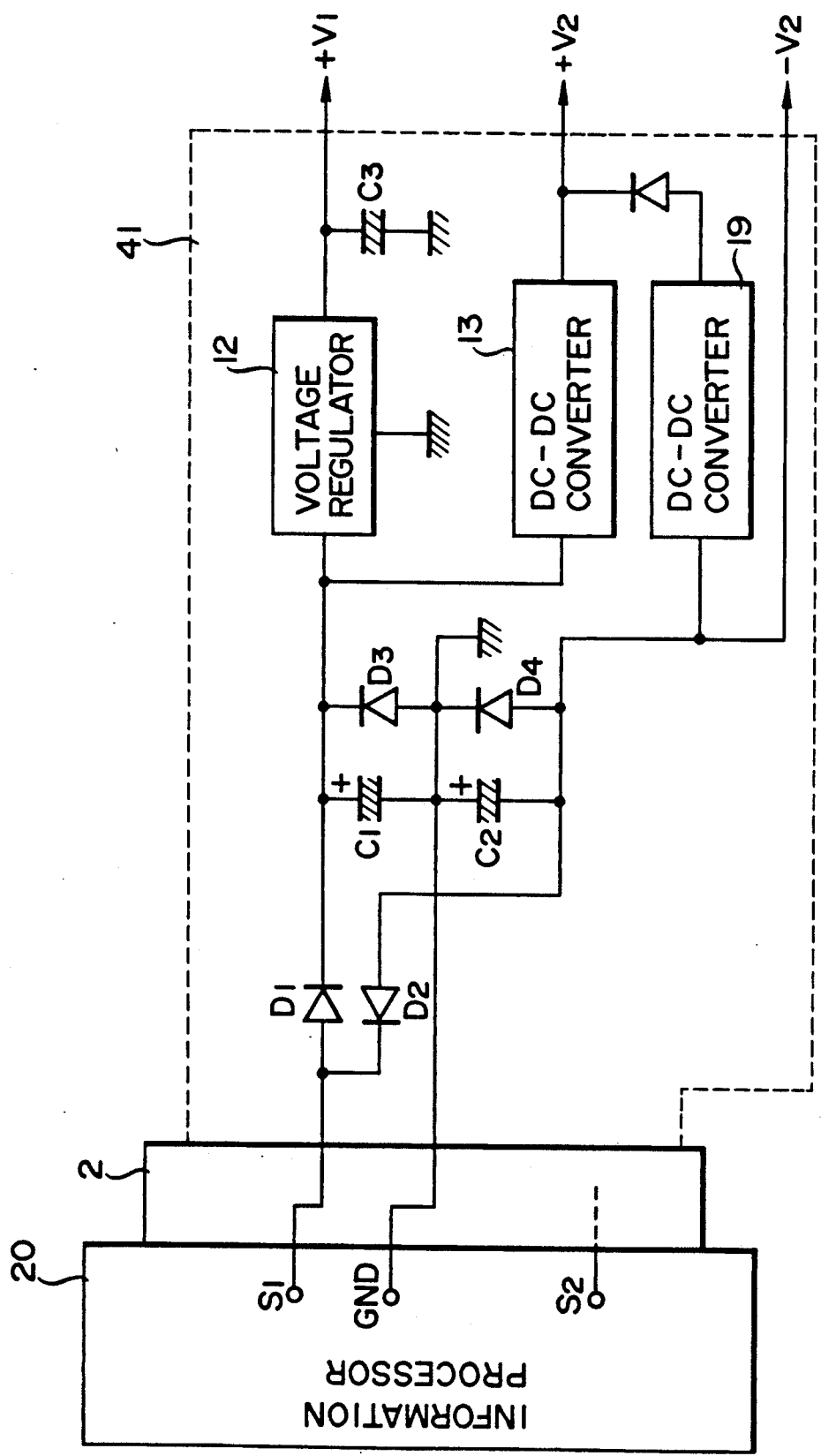
FIG. 8 is a detailed circuit diagram of a stabilized power supply circuit according to a fourth embodiment of the present invention.

In such case where communication starts as soon as the information processor 20 becomes capable of a data transmission, it is possible to produce the power which is required up to the start of operation from the "−" potential side by a converter circuit. FIG. 8 illustrates an example of an arrangement for performing this. In FIG. 8, numeral 19 denotes a DC-DC converter for producing the power which is required up to the start of operation from the "−" potential side. In accordance with this arrangement, there can be obtained a highly reliable apparatus in a state capable of steady operation and in which transmitted information is not lost even if communication starts as soon as the information processor 20 becomes capable of a data transmission.

In accordance with the present embodiment as described above, a pulse-width modulating/demodulating system is employed as the signal drive system thereof in order to reduce the driving power of the light-emitting element 5, and the arrangement is such that the driving power for the optical communication apparatus is obtained from the electric signal inputted to the optical communication apparatus. As a result, it is unnecessary to separately receive a supply of special-purpose power from the outside, power supply equipment is not required, and it is possible to perform optical communication with an apparatus having an existing electrical communication control arrangement that relies upon metallic conductors.

Thus, the invention reduces the cost, size and required power of the optical communication apparatus and therefore is highly advantageous for use in industry.

In accordance with the present invention as described above, optical communication is made possible without modifying an apparatus having an existing electrical communication control arrangement that relies upon metallic conductors and without adding on special equipment.

The invention also makes it possible to obtain a highly reliable apparatus in which power consumption is reduced and transmission errors are held to the minimum.

As many apparently widely different embodiments of the present invention can be made without departing from the spirit and scope thereof, it is to be understood that the invention is not limited to the specific embodiments thereof except as defined in the appended claims.

What is claimed is:

1. A bi-directional optical communication modulation/demodulation apparatus connected between a pair of optical communication media and a local information processor and capable of converting an electrical signal to an optical signal and vice versa for data communication via said optical media with a remote data information processor, comprising:

first conversion means for converting local data information signals to optical signals for sending to a remote information processor, said first conversion means having connector means for connection between said apparatus and said local information processor for receiving a local input electrical data signal from said local information processor via an electrical data signal line, and having pulse-width modulation means for conducting pulse-width modulation of the received input electrical data signal in synchronization with the leading edge of a clock signal from a clock circuit to thereby produce a pulse-width modulated input electrical data signal, and having electrical to optical converter means for converting the modulated input electrical signal to an optical signal and having external coupling sending means for delivering said optical signal to one of said optical communication media;

second conversion means for converting incoming remote origination signals, said second conversion means having external coupling receiving means for receiving, through the other of said optical information media, a pulse-width modulated input optical information media, a pulse-width modulated input optical signal originating from a remote information processor, and having opto-electrical converter means for converting the received optical signal into a corresponding electrical signal having substantially the same pulse width relating to said modulated input optical signal, and having receiving electrical demodulation means for demodulating said corresponding electrical signal, and having local processor connector means for delivering the demodulated corresponding electrical signal to said local information processor; and power producing means for producing stable DC electrical power for said apparatus also being connected to said electrical data line from said local data processor for receipt of said local input electrical data signal from said local information processor and for delivering from said power producing means the produced electrical power to said first and second conversion means when said input electrical signal is transmitted to said apparatus from said local information processor.

2. A bi-directional optical communication modulation/demodulation apparatus according to claim 1, wherein said first conversion means modulates, immediately after a change in the voltage level of said input electrical signal, the said received input electrical data signal into a pulse-width modulated electrical signal corresponding to said input signal and wherein the input electrical data signal is modulated into a signal equivalent to more than "t" periods of the clock signal at the leading edge of the input electrical data signal and into a signal equivalent to "t" at the trailing edge of the clock signal during the time that the said input electrical signal is on so as to shorten the time of light-emitting time of an optical signal when the conversion means converts the modulated electrical signal into said optical signal and delivers said optical signal to said media, while said second conversion means converts said input optical signal into said electrical signal having substantially the same pulse width relation to said input optical signal which has been modulated upon origination and which is converted to an electrical signal by said opto-electrical conversion before the resulting converted signal is demodulated within the apparatus, the converted electrical signal being demodulated within a demodulating circuit which includes a timer circuit which has an output waveform signal less than 2"t" periods of a timer clock signal but not less than one period thereof and said output waveform starts at the leading edge of the received and converted electrical signal, and wherein the leading and trailing edges of the demodulated converted electrical signal are decided depending upon whether the modulated converted signal is "high" or "low" when the output waveform of the timer circuit represents the energized state.

3. A bi-directional optical communication modulation/demodulation apparatus according to claim 1, wherein said first conversion means modulates said input electrical data signal into a pulse width modulated signal representing the leading and trailing edges of the original signal such that different pulse widths are obtained at the rise and fall of said input electrical data signal, so as to discriminate the rise and fall of said input electrical signal before said electrical to optical converter means converts the electrical pulse signal obtained through the modulation into an optical pulse signal, while said second conversion means converts received input optical signal into electrical pulse signal, discriminating different pulse widths of said electrical pulse signal, and changes the voltage level of the output electrical signal.

4. A bi-directional optical communication modulation/demodulation apparatus according to claim 1, wherein said power producing means includes a DC-DC converter or a voltage regulator capable of producing, from the "+" level of the electrical input signal from said information processor, a stable "+" power for driving said optical communication modulation/demodulation apparatus, said power producing means also being connected such that it delivers said "+" power to an interface circuit including a receiver circuit and a driver circuit, to a transmission circuit including a modulating circuit, clock signal circuit and a drive circuit having a light-emitting element, and to a receiving circuit including a demodulating circuit and an amplifier circuit having a light-receiving element.

5. The apparatus according to claim 4, wherein the DC-DC converter is adapted to have small input-output potential difference.

6. A bi-directional optical communication modulation/demodulation apparatus according to claim 4, wherein said power producing means includes a DC-DC converter capable of producing, from the "−" level of the electrical input signal from said information processor, a stable "+" power required for driving said optical communication modulation/demodulation apparatus, said power producing means being connected such that it delivers said "+" power to an interface circuit including a receiver circuit and a driver circuit, to a transmission circuit including a modulating circuit, clock signal circuit and a drive circuit having a light emitting element, and to a receiving circuit including a demodulating circuit and an amplifier circuit having a light-receiving element.

7. A bi-directional optical transmission modulation/demodulation apparatus according to claim 1, wherein said power producing means includes a polarity-inversion DC-DC converter capable of producing from the "+" level of said input electrical signal from said information processor, a stable "−" electrical power required for driving said optical communication modulation/demodulation apparatus with the "−" power, said power producing means being connected such that it delivers said "−" electrical power to a driver circuit of an interface circuit.

8. An optical communication method for conducting data communication between local and remote information processors through a pair of optical communication media connected therebetween, comprising:

placing, between each of said information processors and said pair of optical communication media, a bi-directional optical communication modulation/demodulation apparatus which comprises:

first sending conversion means for receiving an input electrical signal including data signals from said local information processor, conducting pulse-width modulation of the received input electrical signal to form a modulated electrical signal having leading and trailing data pulse edge indicators of different width converting the modulated electrical signal to an optical signal and delivering said optical signal to one of said optical communication media; second conversion means for receiving, through the other of said optical information media, a pulse-width-modulated input optical signal from one of said remote information processors, converting the received input optical signal into an electrical signal having substantially the same pulse width relation to said input optical signal, demodulating said electrical signal to form a demodulated electrical signal whose leading and trailing edges are decided depending upon whether the modulated electrical signal is high or low when a timer represents an energized state, and delivering the demodulated electrical signal to said information processor; and power producing means for producing electrical power from said electrical signal including data signals received from said information processor and delivering the produced electrical power to said first and second conversion means;

whereby the data communication between said information processors is possible by pulse-width-modulated optical signal, while said information processors have standard interface constructions based on electrical signals and operate under input/output control in accordance with the standard electrical computer data interface specification.

* * * * *

UNITED STATES PATENT AND TRADEMARK OFFICE
CERTIFICATE OF CORRECTION

PATENT NO. : 5,040,242
DATED : August 13, 1991
INVENTOR(S) : Yukinari Tsuchiya

It is certified that error appears in the above-identified patent and that said Letters Patent is hereby corrected as shown below:

Col. 1, line 30:
"network" should be --networks--;

Col. 1, line 38:
after "terminal computer" insert --.--;

Col. 1, line 55:
after "circuit" insert --.--;

Col. 1, line 62:
after "equipment" insert --.--

Figure 10A:
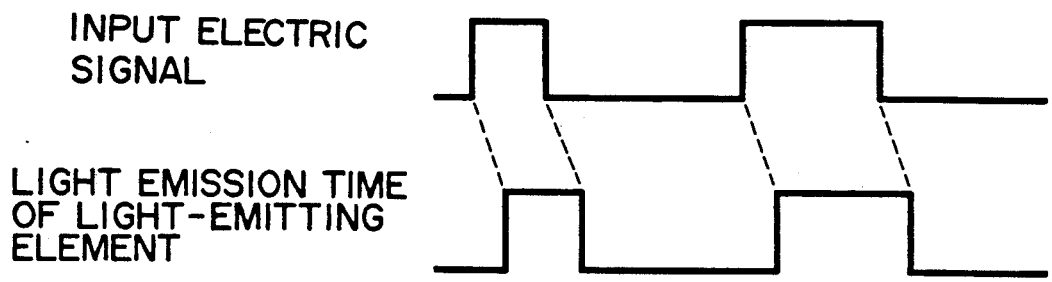
FIG. 10(A) is a timing chart showing light emission timing with regard to a transmitted electric signal in the prior art.
Figure 10B:
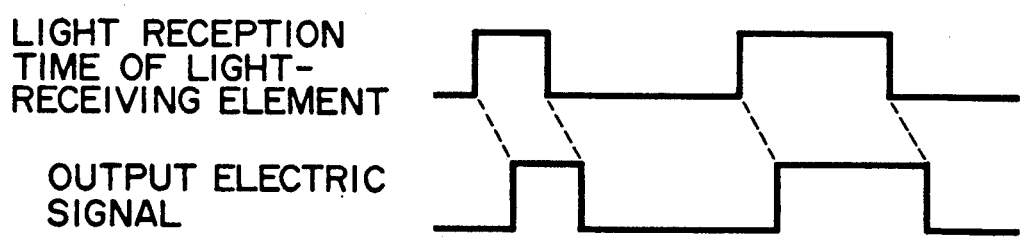

Col. 2, line 26:
after "signal" insert --.--;

Col. 3, line 53
after "line" insert --.--;

Col. 3, line 62:
after "art" insert --.--;

Col. 4, line 59:
"is chart" should be --is a timing chart--;

Col. 5, line 15:
"FIG. 11(B)" should be --FIG. 10(B)--;

Col. 5, line 54:
after "apparatus" insert --.--;

Col. 7, line 61:
after "transmission" insert --.--;

UNITED STATES PATENT AND TRADEMARK OFFICE
CERTIFICATE OF CORRECTION

PATENT NO. : 5,040,242

DATED : August 13, 1991

INVENTOR(S) : Yukinari Tsuchiya

It is certified that error appears in the above-identified patent and that said Letters Patent is hereby corrected as shown below:

Col. 8, line 50:
after "signals" insert --.--;

Col. 10, line 4:
after "examples" insert --.--;

Col. 10, line 60:
after "large" insert --.--;

Col. 11, line 2:
after "For" delete "(";

Col. 13, claim 1, lines 7 & 8:
after "media" delete "a pulse-width modulated input optical information media,";

Col. 13, claim 1, line 13:
""relating" should be --relation--;

UNITED STATES PATENT AND TRADEMARK OFFICE
CERTIFICATE OF CORRECTION

PATENT NO. : 5,040,242
DATED : August 13, 1991
INVENTOR(S) : Yukinari Tsuchiya

It is certified that error appears in the above-identified patent and that said Letters Patent is hereby corrected as shown below:

Col. 13, line 43, Claim 2:
"of an optical" should be --of an on optical--;

Col. 14, line 28, claim 5:
after "have" insert --a--.

Signed and Sealed this

First Day of June, 1993

Attest:

MICHAEL K. KIRK

Attesting Officer     Acting Commissioner of Patents and Trademarks